United States Patent
Mou et al.

(10) Patent No.: US 10,935,478 B2
(45) Date of Patent: Mar. 2, 2021

(54) PARTICLE DETECTING DEVICE

(71) Applicant: Microjet Technology Co., Ltd., Hsinchu (TW)

(72) Inventors: Hao-Jan Mou, Hsinchu (TW); Chin-Chuan Wu, Hsinchu (TW); Chih-Kai Chen, Hsinchu (TW); Ching-Sung Lin, Hsinchu (TW); Chi-Feng Huang, Hsinchu (TW); Yung-Lung Han, Hsinchu (TW); Chun-Yi Kuo, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 16/816,035

(22) Filed: Mar. 11, 2020

(65) Prior Publication Data

US 2020/0292438 A1    Sep. 17, 2020

(30) Foreign Application Priority Data

Mar. 15, 2019    (TW) .................................. 108108981

(51) Int. Cl.
*G01N 15/02* (2006.01)
*G01N 15/06* (2006.01)
(Continued)

(52) U.S. Cl.
CPC ............. *G01N 15/02* (2013.01); *G01N 15/06* (2013.01); *G01N 15/0656* (2013.01);
(Continued)

(58) Field of Classification Search
CPC ............... G01N 15/02; G01N 15/0205; G01N 15/0211; G01N 15/0656; G01N 15/06;
(Continued)

(56) References Cited

U.S. PATENT DOCUMENTS 6,831,289 B1 * 12/2004 Preikszas ........... G01N 15/0205
                                                                250/574
9,726,579 B2 *  8/2017 Han ....................... G01N 15/06
(Continued)

FOREIGN PATENT DOCUMENTS

CN    207396276 U    5/2018
CN    207816772 U    9/2018
(Continued)

*Primary Examiner* — Gordon J Stock, Jr.
(74) *Attorney, Agent, or Firm* — Birch, Stewart, Kolasch & Birch, LLP

(57) ABSTRACT

A particle detecting device is provided. The particle detecting device includes a base, a detecting element, a micro pump and a drive control board. The base includes a detecting channel, a beam channel and a light trapping region. The detecting element includes a microprocessor, a particle sensor and a laser transmitter. The particle sensor is disposed at an orthogonal position where the detecting channel intersects the beam channel. When the micro pump, the particle sensor and the laser transmitter are enabled under the control of the microprocessor, the gas outside the detecting channel is inhaled into the detecting channel. When the gas flows to the orthogonal position where the detecting channel intersects the beam channel, the gas is irradiated by the projecting light source from the laser transmitter, and projecting light spots generated are projected on the particle sensor for detecting the size and the concentration of suspended particles.

19 Claims, 15 Drawing Sheets

(51) Int. Cl.
*G01N 15/14* (2006.01)
*G01N 15/00* (2006.01)

(52) U.S. Cl.
CPC . *G01N 15/1459* (2013.01); *G01N 2015/0007* (2013.01); *G01N 2015/0046* (2013.01); *G01N 2015/0693* (2013.01)

(58) Field of Classification Search
CPC .... G01N 15/10; G01N 15/1012; G01N 15/14; G01N 15/1425; G01N 15/1429; G01N 15/1431; G01N 15/1434; G01N 15/1436; G01N 15/1456; G01N 15/1459; G01N 15/147; G01N 15/1484; G01N 2015/0007; G01N 2015/0046; G01N 2015/0238; G01N 2015/025; G01N 2015/0277; G01N 2015/0283; G01N 2015/0288; G01N 2015/03; G01N 2015/035; G01N 2015/0693; G01N 2015/1043; G01N 2015/1081; G01N 2015/1087; G01N 2015/1486; G01N 2015/1477; G01N 2015/149; G01N 2015/1493; G01N 33/0004; G01N 33/0006; G01N 33/0008; G01N 33/0009; G01N 33/001; G01N 33/0016; G01N 33/0022; G01N 33/0027; G01N 33/0062
See application file for complete search history.

(56) References Cited

U.S. PATENT DOCUMENTS

| | | | | |
|---|---|---|---|---|
| 10,488,305 | B2* | 11/2019 | Miller-Lionberg | G01N 1/2273 |
| 10,620,106 | B2* | 4/2020 | Mou | G01N 15/0211 |
| 10,775,276 | B2* | 9/2020 | Mou | G01N 33/0073 |
| 2019/0055934 | A1* | 2/2019 | Mou | F04B 43/046 |
| 2019/0302072 | A1* | 10/2019 | Mou | G01N 33/0047 |
| 2019/0331564 | A1* | 10/2019 | Mou | G01N 15/0205 |
| 2019/0331582 | A1* | 10/2019 | Mou | G01N 33/0073 |
| 2019/0353157 | A1* | 11/2019 | Mou | F04B 43/046 |
| 2020/0173971 | A1* | 6/2020 | Mou | G01N 33/0063 |
| 2020/0292437 | A1* | 9/2020 | Mou | G01N 33/0009 |

FOREIGN PATENT DOCUMENTS

| | | |
|---|---|---|
| CN | 208399327 U | 1/2019 |
| TW | I625517 B | 6/2018 |
| TW | M574684 U | 2/2019 |

* cited by examiner

PARTICLE DETECTING DEVICE

FIELD OF THE INVENTION

The present disclosure relates to a particle detecting device, and more particularly to a particle detecting device capable of being assembled to a slim portable device for gas monitoring.

BACKGROUND OF THE INVENTION

Suspended particles are solid particles or droplets contained in the air. Since the sizes of the suspended particles are really small, the suspended particles may enter the lungs of human body through the nasal hair in the nasal cavity easily, thus causing inflammation in the lungs, asthma or cardiovascular disease. If other pollutants are attached to the suspended particles, it will further increase the harm to the respiratory system. In recent years, the problem of air pollution is getting worse. In particular, the concentration of particle matters (e.g., PM2.5) is often too high. Therefore, the monitoring to the concentration of the gas suspended particles is taken seriously. However, the gas flows unstably due to variable wind direction and air volume, and the general gas-quality monitoring station is located in a fixed place. Under this circumstance, it is impossible for people to check the concentration of suspended particles in current environment. Thus, a miniature and portable gas detecting device is needed for allowing the user to check the concentration of surrounding suspended particles anytime and anywhere.

Therefore, there is a need of providing a particle detecting device for monitoring the concentration of suspended particles anytime and anywhere.

SUMMARY OF THE INVENTION

An object of the present disclosure provides a particle detecting device. A detecting channel and a beam channel are defined and partitioned in a slim base, and a laser transmitter and a particle sensor of the detecting element and the micro pump are positioned in the base. With the help of micro pump, the gas is transported along the detecting channel, which is a straight gas-flowing path. Thus, the introduced gas can pass through the orthogonal position where the detecting channel intersects the beam channel smoothly and steadily, and the size and concentration of the suspended particles contained in the gas can be detected. In addition, the light trapping structure of the light trapping region is a paraboloidal structure, and the light trapping distance between the beam channel and the position where the light trapping structure receives the projecting light source from the light transmitter is maintained to be greater than 3 mm. Accordingly, the projecting light source from the light transmitter forms a focus point on the paraboloidal light trapping structure, and the stray light being directly reflected back to the beam channel is eliminated. Consequently, the results of particle detecting become more accurate. Moreover, there is a protective film, which covers on and seals the outer inlet terminal of the detecting channel. Consequently, the detecting channel is capable of introducing gas and being waterproof and dustproof at the same time, and the detection accuracy and lifespan of the detecting channel would not be affected. The particle detecting device of the present disclosure is really suitable to be assembled to the portable electric device and wearable accessory for forming a mobile particle detecting device allowing the user to monitor the concentration of surrounding suspended particles anytime and anywhere.

In accordance with an aspect of the present disclosure, a particle detecting device is provided. The particle detecting device includes a base, a detecting element, a micro pump and a drive control board. A detecting-element accommodation region, a micro-pump accommodation region, a detecting channel, a beam channel and a light trapping region are defined and partitioned inside the base. The detecting channel and the beam channel are perpendicular to each other. The beam channel perpendicularly passes through the detecting channel and communicates with the light trapping region. The detecting channel is a straight gas-flowing path. The micro-pump accommodation region is in fluid communication with the detecting channel. The detecting element includes a microprocessor, a particle sensor and a laser transmitter. The laser transmitter is positioned in the detecting-element accommodation region and is configured to transmit a projecting light source to the light trapping region through the beam channel. The particle sensor is disposed at an orthogonal position where the detecting channel intersects the beam channel, thereby detecting a size and a concentration of suspended particles contained in a gas in the detecting channel. The micro pump is accommodated and positioned in the micro-pump accommodation region in fluid communication with the detecting channel. The micro pump is configured to transport the gas in the detecting channel. The drive control board is sealed and covered on a bottom of the base. The microprocessor, the particle sensor and the laser transmitter are packaged and positioned on the drive control board and are electrically connected to the drive control board respectively, the particle sensor and the laser transmitter are driven and controlled by the microprocessor, and the micro pump is electrically connected to the drive control board for being driven and controlled by the microprocessor. When the micro pump, the particle sensor and the laser transmitter are enabled under the control of the microprocessor, a suction force is generated in the detecting channel and the gas outside the detecting channel is inhaled into the detecting channel. When the gas in the detecting channel passes through the orthogonal position where the detecting channel intersects the beam channel, the gas passing therethrough is irradiated by the projecting light source from the laser transmitter, and projecting light spots generated are projected on the particle sensor for detecting the size and the concentration of suspended particles.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
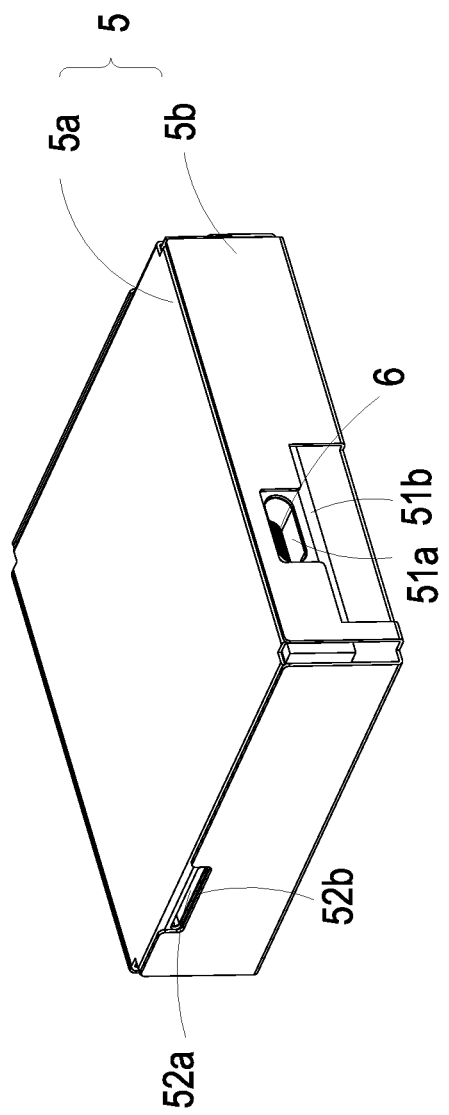
FIG. 1 is a schematic exterior view illustrating a particle detecting device according to an embodiment of the present disclosure.
Figure 2:
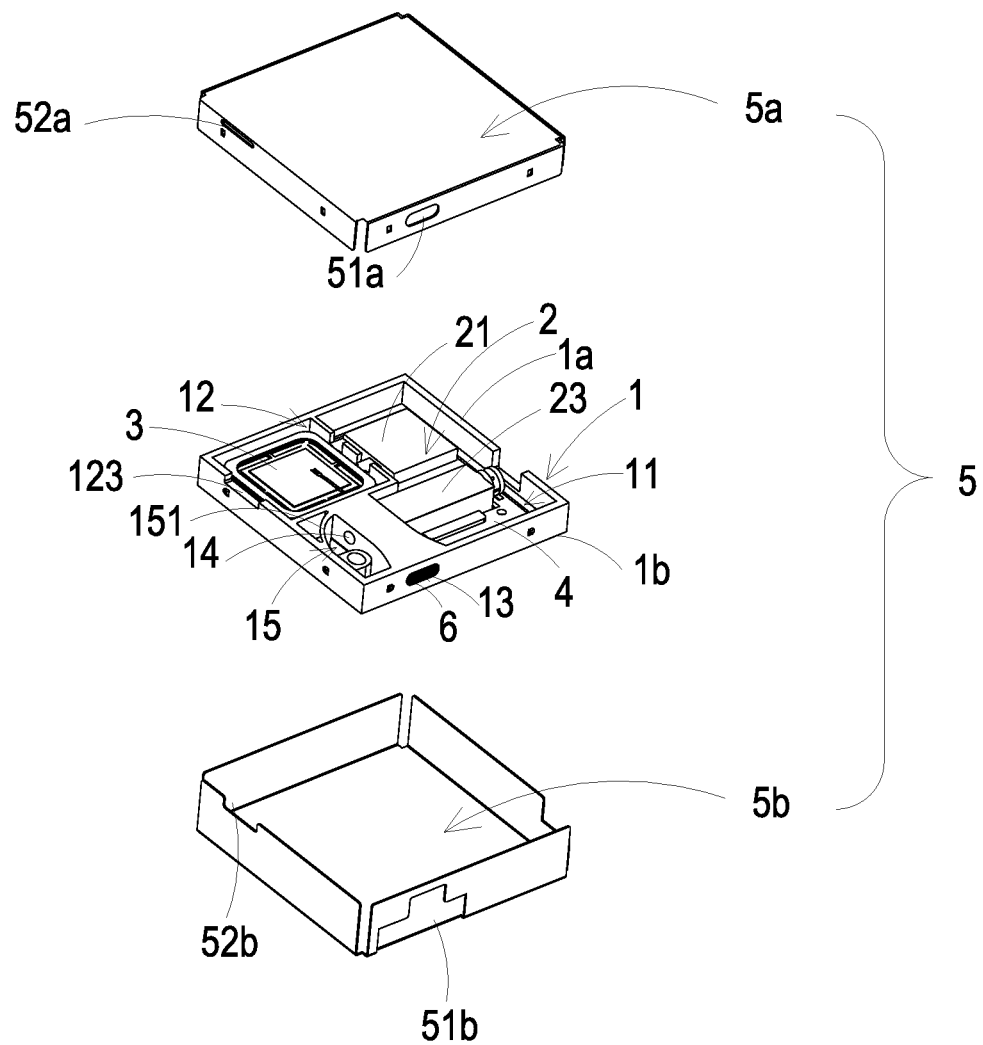
FIG. 2 is a schematic exploded view illustrating the components of the particle detecting device of the present disclosure.
Figure 3:
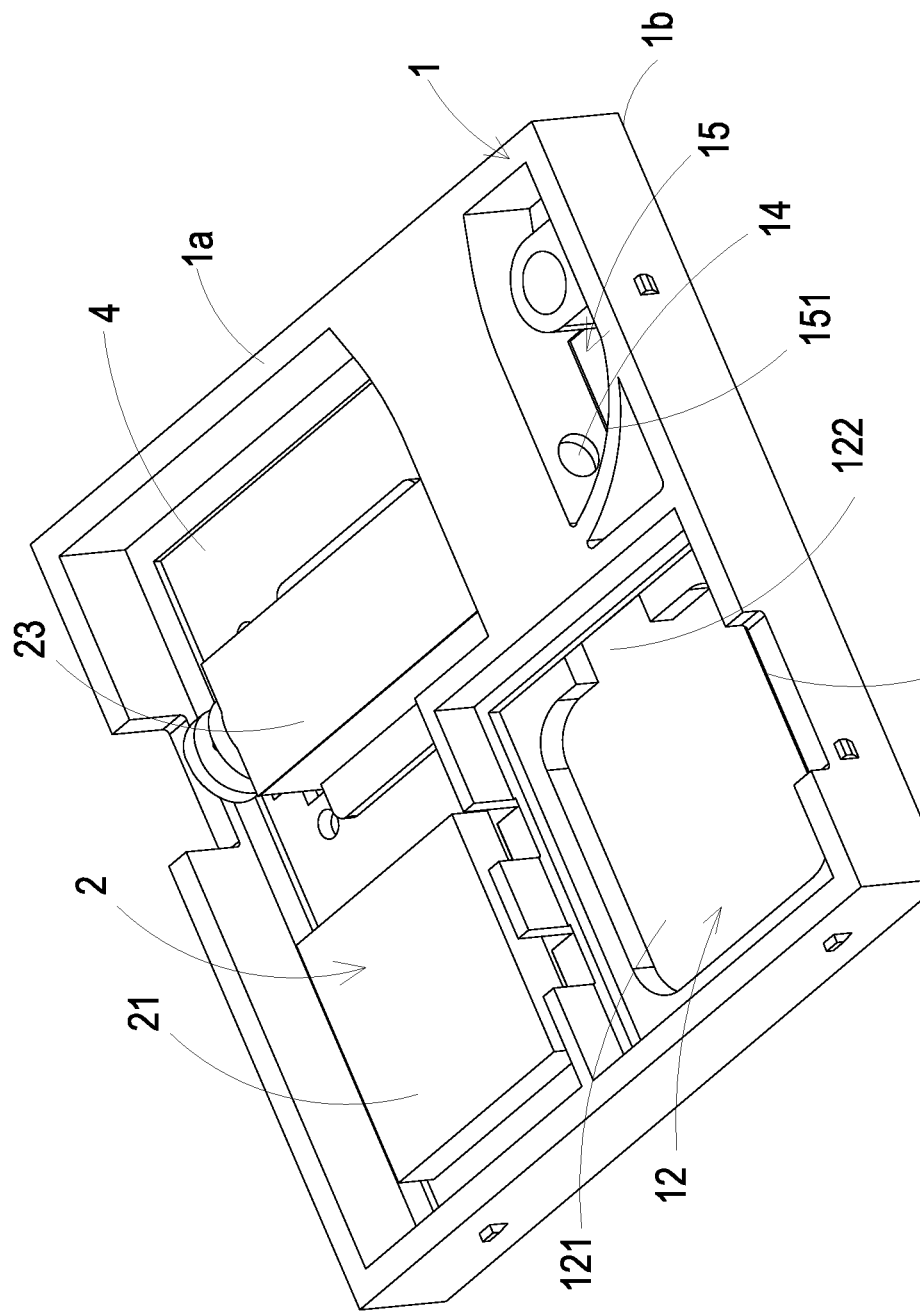
FIG. 3 is a schematic perspective view illustrating a base of the particle detecting device of the present disclosure.
Figure 4A:
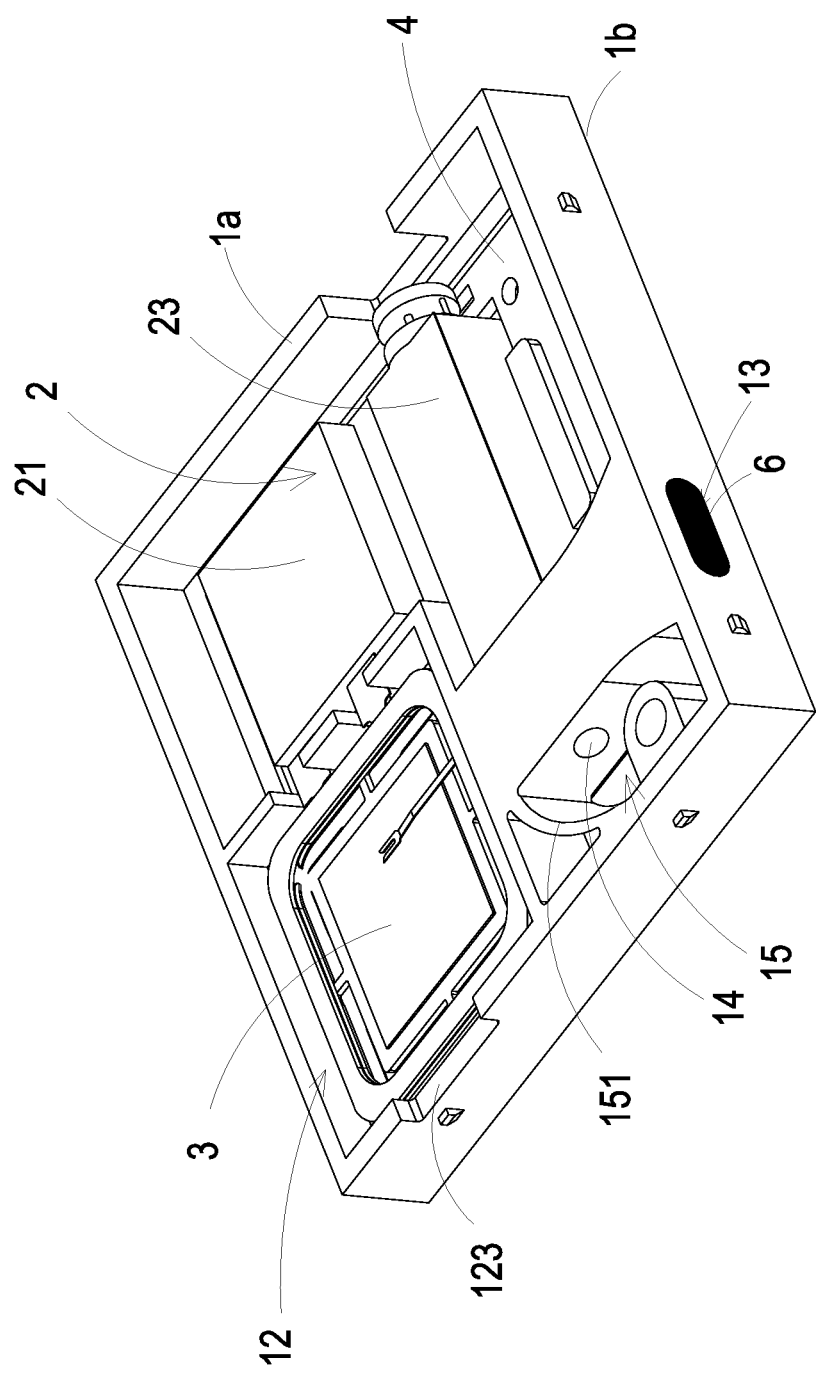
FIG. 4A is a schematic perspective view illustrating the base assembled with a micro pump of the particle detecting device of the present disclosure.
Figure 4B:
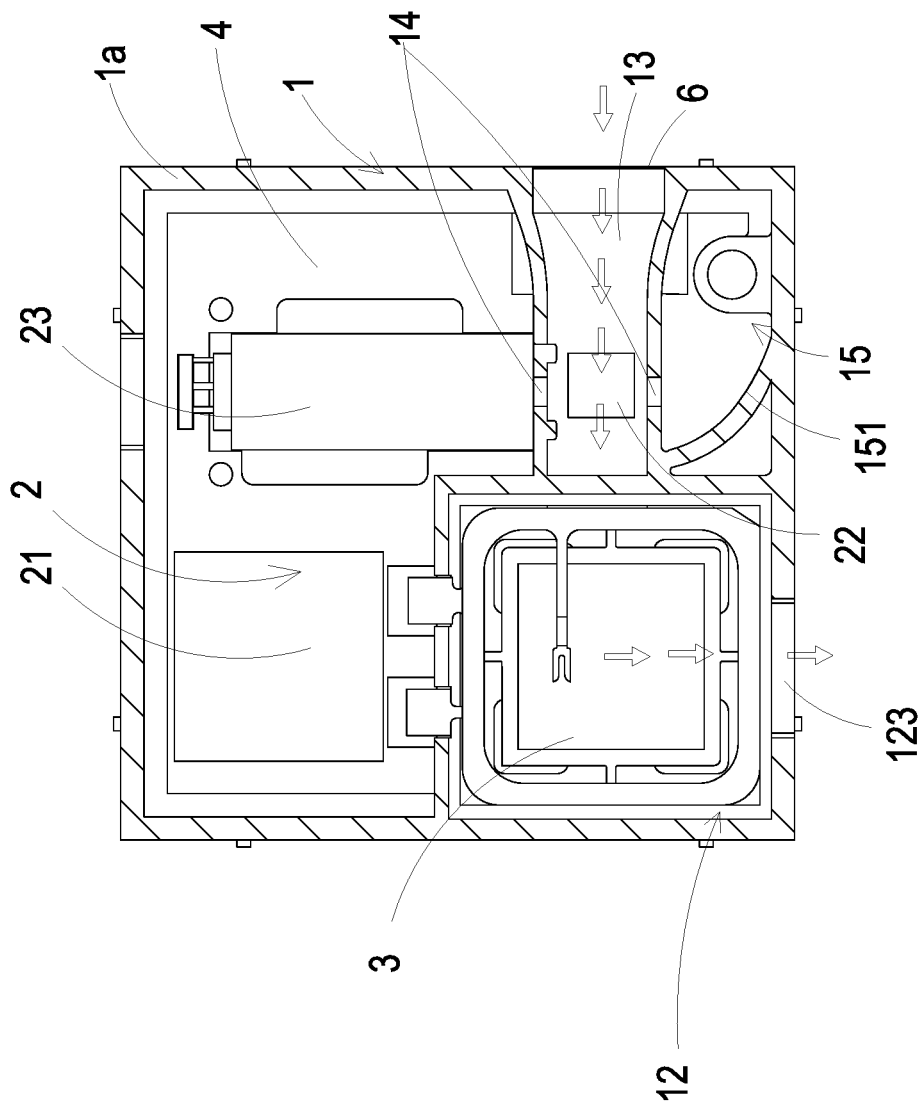
FIG. 4B schematically shows the gas flowing while the particle detecting device of the present disclosure is detecting.
Figure 4C:
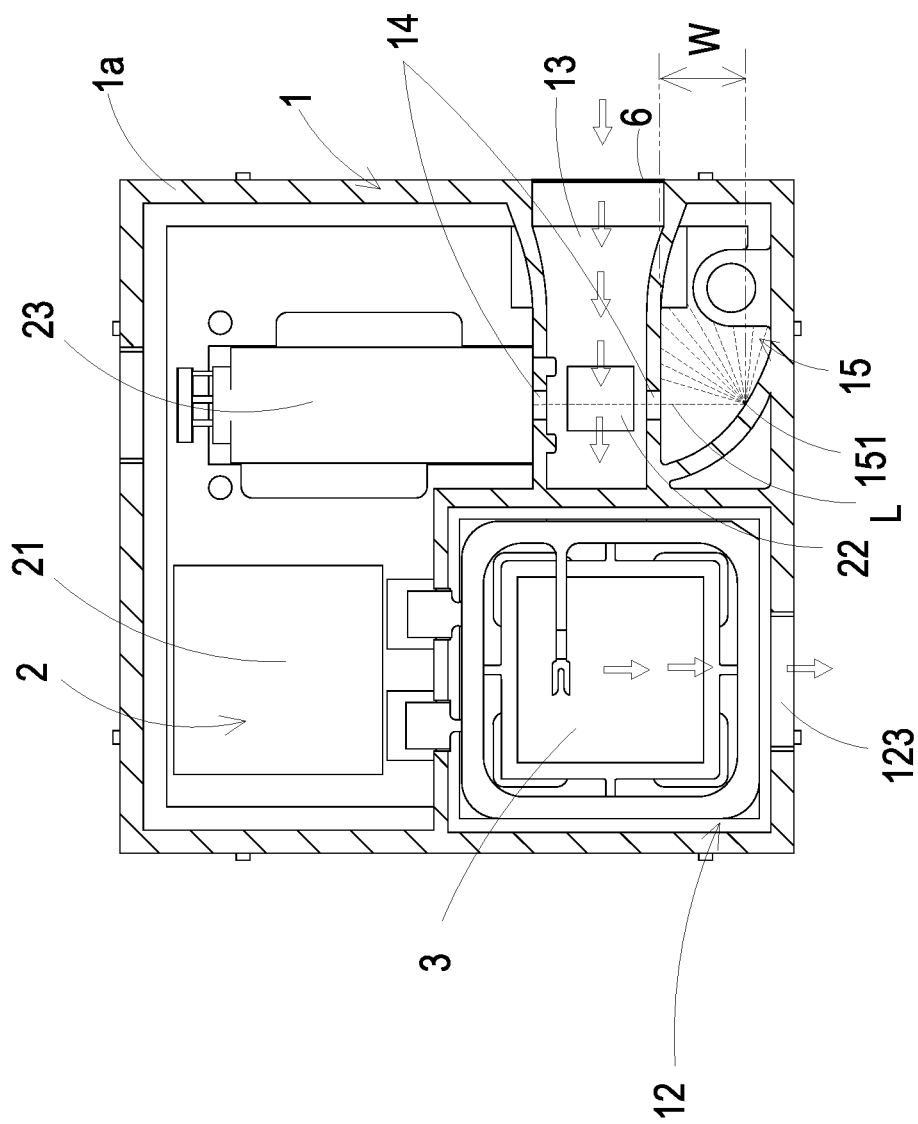
FIG. 4C schematically shows the gas flowing and the light source projecting while the particle detecting device of the present disclosure is detecting.

Please refer to FIGS. 1 to 4C. The present disclosure provides a particle detecting device including a base 1, a detecting element 2, a micro pump 3, a drive control board 4, an outer cover 5 and a protective film 6. The base 1 has a first surface 1a and a second surface 1b, and the first surface 1a and the second surface 1b are two surfaces opposite to each other. A detecting-element accommodation region 11, a micro-pump accommodation region 12, a detecting channel 13, a beam channel 14 and a light trapping region 15 are defined and partitioned inside the base 1. The detecting channel 13 and the beam channel 14 are perpendicular to each other. The beam channel 14 perpendicularly penetrates through the detecting channel 13 and is in fluid communication with the light trapping region 15. More specifically, the detecting channel 13 extends along a first direction and the beam channel 14 extends along a second direction, and the first direction is perpendicular to the second direction. The detecting channel 13 extends straight from one side of the beam channel 14 to the other side of the beam channel 14, and thus the detecting channel 13 intersects the beam channel 14. The drive control board 4 is sealed and covered on the second surface 1b of the base 1, and the detecting channel 13 is covered by the drive control board 4 to form a straight gas-flowing path. The protective film 6 covers on and seals the outer inlet terminal of the detecting channel 13. The protective film 6 is a film structure, which is waterproof and dustproof but allows the gas to pass therethrough. Consequently, the detecting channel 13 is capable of introducing gas while being waterproof and dustproof, by which the larger particles contained in the outside air are filtered out. In this way, the protective film 6 may avoid introducing the larger particles into the detecting channel 13, and the detecting channel 13 is free of pollution. In other words, only the smaller suspended particles (e.g., PM2.5) are introduced into the detecting channel 13 for detection, and the detection accuracy and lifespan of the detecting channel 13 would not be affected. The detecting element 2 is packaged and positioned on the drive control board 4, and the detecting element 2 is electrically connected to the drive control board 4. The detecting element 2 is disposed in the detecting-element accommodation region 11. The micro pump 3 is electrically connected to the drive control board 4, and the operation of the micro pump 3 is driven and controlled by the drive control board 4. An accommodation frame slot 121 and an inlet 122 are disposed at the bottom of the micro-pump accommodation region 12, and an outlet 123 in fluid communication with the outside space is disposed at the top of the micro-pump accommodation region 12. The inlet 122 is in fluid communication between the detecting channel 13 and the accommodation frame slot 121. The micro pump 3 is accommodated and positioned on the accommodation frame slot 121. When the micro pump 3 is enabled, a suction force is generated in the detecting channel 13 in fluid communication with the accommodation frame slot 121, and the gas outside the detecting channel 13 is inhaled into the detecting channel 13 by the suction force. Afterwards, by the transportation of the micro pump 3, the gas is introduced to the space above the accommodation frame slot 121, and then the gas is discharged from the outlet 123. Consequently, the gas transportation for gas detection is realized, and the gas is transported along the path indicated by the arrows shown in FIG. 4B. In addition, the light trapping region 15 includes a light trapping structure 151 disposed therein and corresponding to the beam channel 14. The light trapping structure 151 is a paraboloidal structure utilized for making the projecting light source L from the beam channel 14 form a focus point thereon, so as to eliminate the stray light. Moreover, as shown in FIG. 4C, a light trapping distance W is maintained between the beam channel 14 and the position where the light trapping structure 151 receives the projecting light source L. More specifically, the beam channel 14 has two openings, one is an entry opening and the other is an exit opening. The entry opening allows the light to enter the beam channel 14, and the exit opening allows the light to leave the beam channel 14 and toward the light trapping structure 151. The light trapping distance W is the distance between the exit opening of the beam channel 14 and the focus point on the light trapping structure 151. It is noted that the light trapping distance W has to be greater than 3 mm. If the light trapping distance W is smaller than 3 mm, much of the stray light would be directly reflected back to the beam channel 14 when the projecting light source L projected on and is reflected by the light trapping structure 151. Under this circumstance, the detection accuracy may be influenced and distorted (i.e., lack fidelity). Conventionally, the light trapping structure has an inclination of 45 degrees, and the light trapping distance is not taken into consideration, which may cause too much stray light being directly reflected back to the beam channel and further affect the detection accuracy. Different from the conventional technique, in the present disclosure, the light trapping structure 151 is a paraboloidal structure, and the light trapping distance W is greater than 3 mm, which can overcome the said drawbacks of the conventional technique.

Please refer to FIGS. 4A, 4B and 4C. The detecting element 2 includes a microprocessor 21, a particle sensor 22 and a laser transmitter 23. The microprocessor 21, the particle sensor 22 and the laser transmitter 23 are packaged on the drive control board 4. The laser transmitter 23 is disposed in the detecting-element accommodation region 11, and the laser transmitter 23 is configured to transmit the projecting light source L to the beam channel 14. As described above, the detecting channel 13 is perpendicular to the beam channel 14, and thus there is the orthogonal position located at the intersection of the detecting channel 13 and the beam channel 14. The particle sensor 22 is disposed at the orthogonal position where the detecting channel 13 intersects the beam channel 14. The laser transmitter 23 and the particle sensor 22 are driven and controlled by the microprocessor 21. The projecting light source L from the laser transmitter 23 is controlled to be projected into the beam channel 14 and pass through the orthogonal position where the detecting channel 13 intersects the beam channel 14. Thereby, the suspended particles (e.g., PM2.5) contained in the passing gas in the detecting channel 13 is irradiated by the projecting light source L, and the projection light spots generated accordingly are projected on the particle sensor 22 for detection and calculation. The particle sensor 22 detects the size and concentration of the suspended particles contained in the gas and outputs a detection signal. The particle sensor 22 is a PM2.5 sensor. The microprocessor 21 receives and analyzes the detection signal outputted by the particle sensor 22, and the microprocessor 21 outputs a detection data.

Please refer to FIGS. 1 and 2 again. The outer cover 5 includes a top cover 5a and a bottom cover 5b. The top cover 5 is covered on the first surface 1a of the base 1. The top cover 5 has an inlet hole 51a and an outlet hole 52a. The inlet hole 51a is disposed in a position corresponding to the outer inlet terminal of the detecting channel 13 of the base 1. The outlet hole 52a is disposed in a position corresponding to the outlet 123 of the micro-pump accommodation region 12. The bottom cover 5b is covered on the second surface 1b of the base 1, and the bottom cover 5b and top cover 5a are engaged with each other to seal the base 1. The bottom cover 5b has an inlet opening 51b and an outlet opening 52b. The inlet opening 51b is disposed in a position corresponding to the inlet hole 51a of the top cover 5a. The outlet opening 52b is disposed in a position corresponding to the outlet hole 52a of the top cover 5a. Therefore, the gas outside the particle detecting device can be introduced into the detecting channel 13 of the base 1 through the inlet opening 51b and the inlet hole 51a. The gas in the detecting channel 13 of the base 1 is released from the outlet 123 of the micro-pump accommodation region 12 and is further discharged to the space outside the particle detecting device through the outlet hole 52a and the outlet opening 52b.

Please refer to FIGS. 2, 4A, 4B, 4C, 5, 6A, 6B and 7A. The micro pump 3 is accommodated in the accommodation frame slot 121 of the micro-pump accommodation region 12 of the base 1. The micro pump 3 includes a gas inlet plate 31, a resonance plate 32, a piezoelectric actuator 33, an insulation plate 34 and a conducting plate 35, which are stacked on each other sequentially. The gas inlet plate 31 has at least one inlet aperture 31a, at least one convergence channel 31b and a convergence chamber 31c. The number of the inlet aperture 31a is the same as the number of the convergence channel 31b. In this embodiment, the number of the inlet aperture 31a and the convergence channel 31b is exemplified by four for each but not limited thereto. The four inlet apertures 31a penetrate through the four convergence channels 31b respectively, and the four convergence channels 31b converge to the convergence chamber 31c. In the embodiment, the resonance plate 32 is assembled on the gas inlet plate 31 by attaching. The resonance plate 32 has a central aperture 32a, a movable part 32b and a fixed part 32c. The central aperture 32a is located at the center of the resonance plate 32 and is aligned with the convergence chamber 31c of the gas inlet plate 31. The region of the resonance plate 32 around the central aperture 32a and corresponding to the convergence chamber 31c is the movable part 32b. The region of the periphery of the resonance plate 32 securely attached on the gas inlet plate 31 is the fixed part 32c. In the embodiment, the piezoelectric actuator 33 includes a suspension plate 33a, an outer frame 33b, at least one connecting part 33c, a piezoelectric element 33d, at least one vacant space 33e and a bulge 33f. The suspension plate 33a is a square suspension plate having a first surface 331a and a second surface 332a opposite to the first surface 331a. The outer frame 33b is disposed around the periphery of the suspension plate 33a. The outer frame 33b has an assembling surface 331b and a bottom surface 332b. The at least one connecting part 33c is connected between the suspension plate 33a and the outer frame 33b for elastically supporting the suspension plate 33a. The first surface 331a of the suspension plate 33a is coplanar with the assembling surface 331b of the outer frame 33b. The second surface 332a of the suspension plate 33a is coplanar with the bottom surface 332b of the outer frame 33b. The at least one vacant space 33e is formed among the suspension plate 33a, the outer frame 33b and the at least one connecting part 33c for allowing the gas to flow through. In addition, the first surface 331a of the suspension plate 33a has the bulge 33f. In this embodiment, the formation of the bulge 33f may be made by using an etching process, in which the region between the periphery of the bulge 33f and the junction of the suspension plate 33a and the least one connecting part 33c is partially removed to be concaved. Accordingly, the bulge surface 331f of the bulge 33f of the suspension plate 33a is higher than the first surface 331a, and a stepped structure is formed. Additionally, the outer frame 33b is disposed around the outside of the suspension plate 33a, and the outer frame 33b has a conducting pin 333b extended outwardly. Preferably but not exclusively, the conducting pin 333b is configured for electrical connection. The present disclosure is not limited thereto.

In the embodiment, the resonance plate 32 and the piezoelectric actuator 33 are stacked and assembled to each other via a filling material g, and a chamber space 36 is formed between the resonance plate 32 and the piezoelectric actuator 33. The filling material g is for example but not limited to a conductive adhesive. The filling material g is configured to form a gap h between the resonance plate 32 and the piezoelectric actuator 33. Namely, a depth of the gap h is maintained between resonance plate 32 and the bulge surface 331f of the bulge 33f on the suspension plate 33a of the piezoelectric actuator 33. Therefore, the transported gas can flow faster. Further, due to the proper distance maintained between the bulge 33f of the suspension plate 33a and the resonance plate 32, the contact and interference therebetween are reduced, which also reduces the noise generated.

Figure 7A:
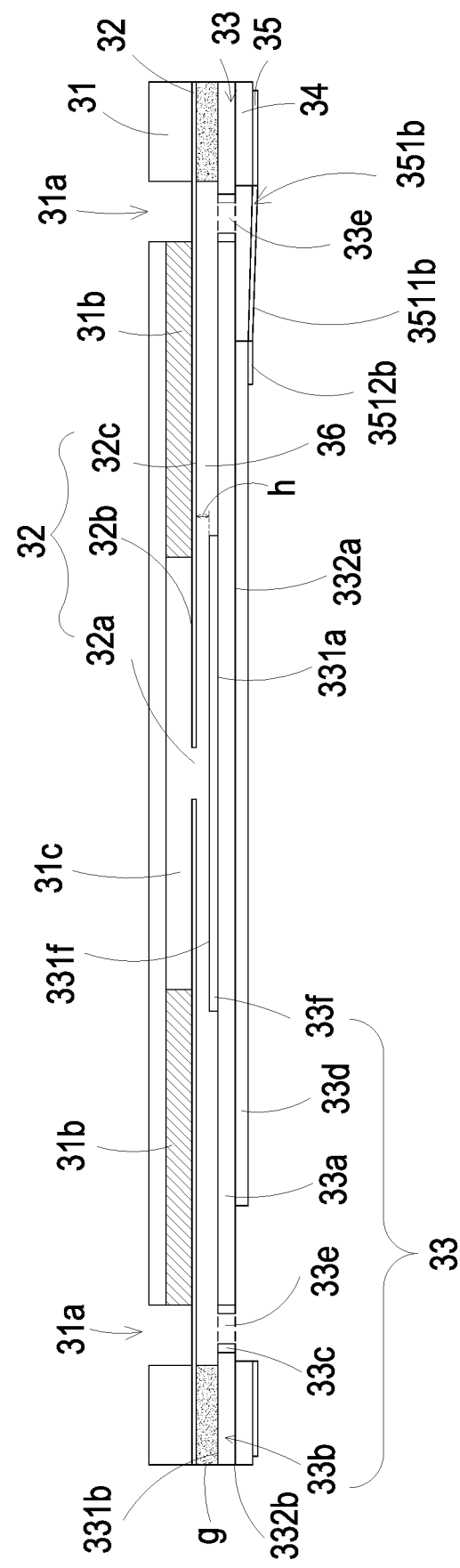
FIG. 7A is a schematic cross-sectional view illustrating the micro pump of the present disclosure.
Figure 7B:
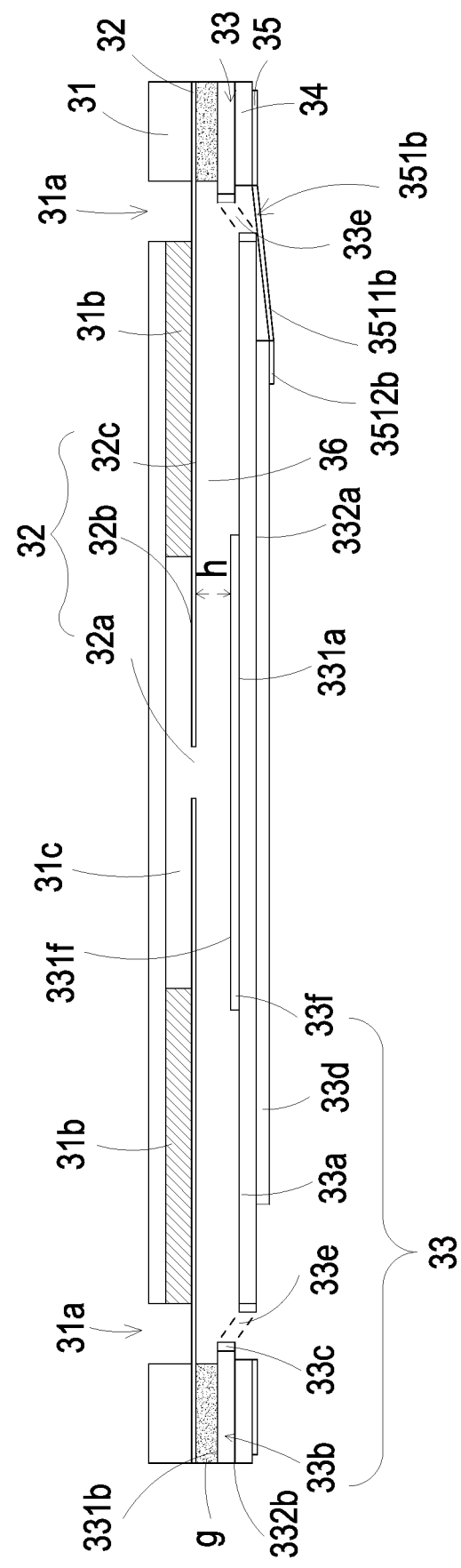
FIG. 7B is a schematic cross-sectional view illustrating a micro pump according to another embodiment of the present disclosure.

In another embodiment, as shown in FIG. 7B, the resonance plate 32 and the piezoelectric actuator 33 are stacked and assembled to each other via a filling material g, and a chamber space 36 is formed between the resonance plate 32 and the piezoelectric actuator 33. In addition, the suspension plate 33a is further processed by using a stamping method, by which the outer frame 33b, the connecting part 33c and the suspension plate 33a have a concave profile in cross section for forming the chamber space 36. The concave distance can be adjusted through changing an inclined angle of the at least one connecting part 33c formed between the suspension plate 33a and the outer frame 33b. Consequently, the first surface 331a of the suspension plate 33a is not coplanar with the assembling surface 331b of the outer frame 33b. Namely, the first surface 331a of the suspension plate 33a is lower than the assembling surface 331b of the outer frame 33b, and the second surface 332a of the suspension plate 33a is lower than the bottom surface 332b of the outer frame 33b. Moreover, the bulge surface 331f of the bulge 33f on the suspension plate 33a is selective to be lower than the assembling surface 331b of the outer frame 33b. In the embodiment, the piezoelectric element 33d is attached on the second surface 332a of the suspension plate 33a and is disposed opposite to the bulge 33f. In response to an applied driving voltage, the piezoelectric element 33d is subjected to a deformation owing to the piezoelectric effect so as to drive the suspension plate 33a to bend and vibrate. In an embodiment, a small amount of filling material g is applied to the assembling surface 331b of the outer frame 33b, and the piezoelectric actuator 33 is attached on the fixed part 32c of the resonance plate 32 after a hot pressing process. Therefore, the piezoelectric actuator 33 and the resonance plate 32 are assembled together. Since the gap h formed between the first surface 331a of the suspension plate 33a and the resonance plate 32 influences the transportation effect of the micro pump 3, it is important to maintain the gap g at a fixed depth for the micro pump 3 in providing stable transportation efficiency. The suspension plate 33a of the micro pump 3 is processed by the stamping method to be concaved in a direction away from the resonance plate 32. Consequently, the first surface 331a of the suspension plate 33a is not coplanar with the assembling surface 331b of the outer frame 33b. Namely, the first surface 331a of the suspension plate 33a is lower than the assembling surface 331b of the outer frame 33b, and the second surface 332a of the suspension plate 33a is lower than the bottom surface 332b of the outer frame 33b. As a result, a space is formed between the concaved suspension plate 33a of the piezoelectric actuator 33 and the resonance plate 32, and the space has an adjustable gap h. The present disclosure provides an improved structure in which the suspension plate 33a of the piezoelectric actuator 33 is processed by the stamping method to be concaved for forming the gap h. Therefore, the required gap h can be formed by adjusting the concaved distance of the suspension plate 33a of the piezoelectric actuator 33, which simplifies the structural design regarding the adjustment of the gap h and achieves the advantages of simplifying the process and shortening the processing time.

Figure 5:
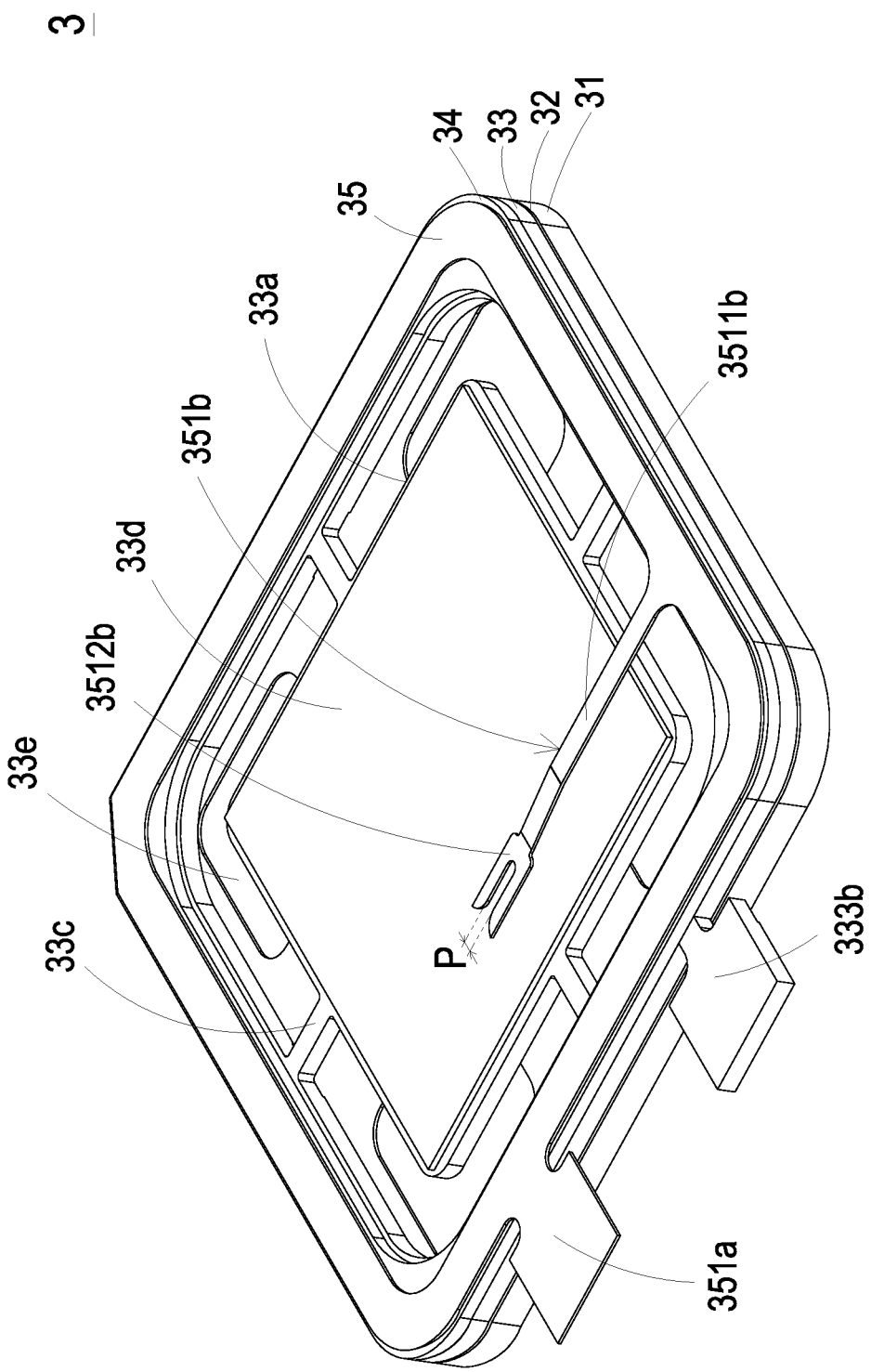
FIG. 5 is a schematic perspective view illustrating the micro pump of the particle detecting device of the present disclosure.
Figure 6A:
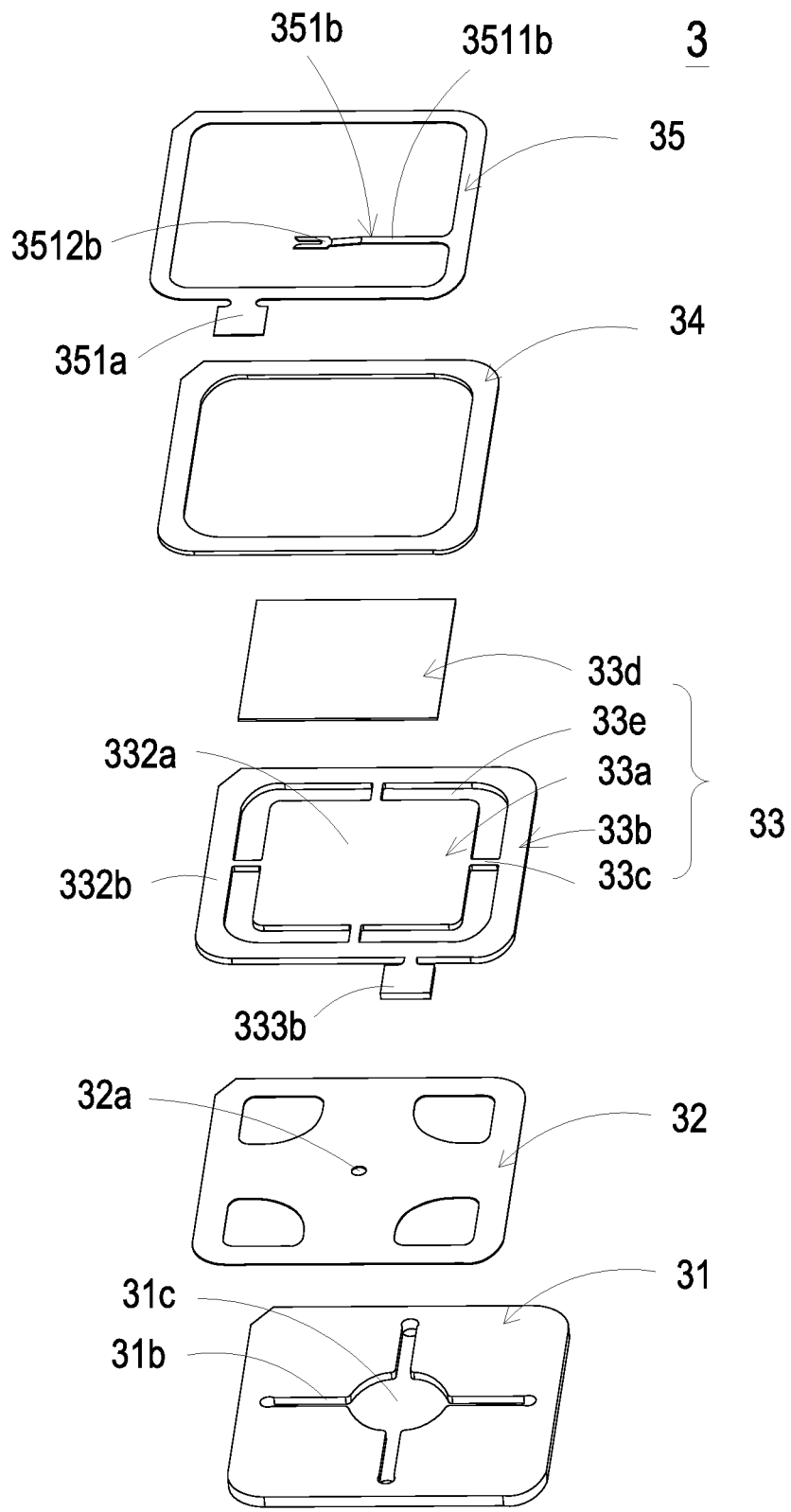
FIG. 6A is a schematic exploded view illustrating the micro pump of the present disclosure and taken along front viewpoint.
Figure 6B:
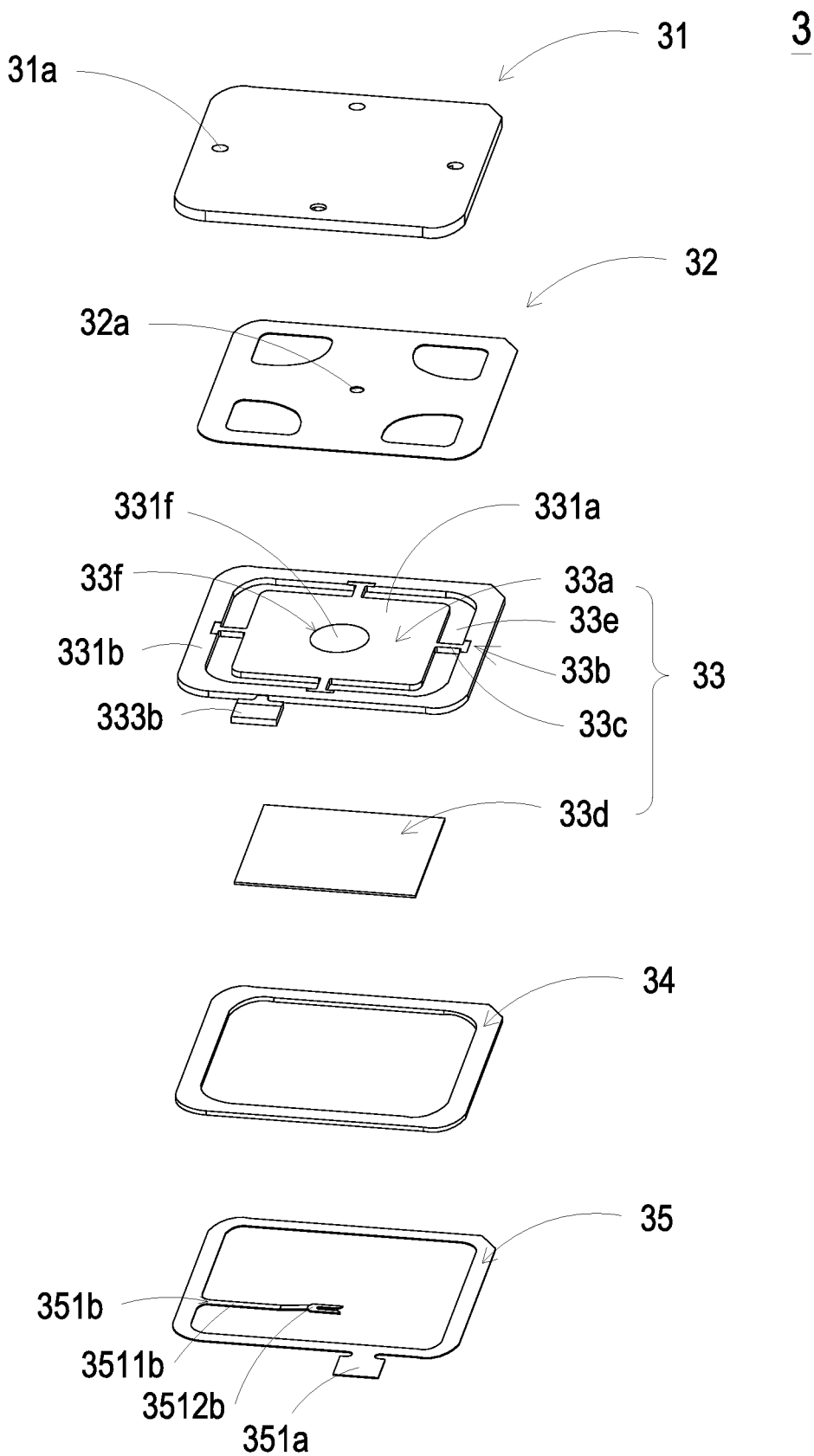
FIG. 6B is a schematic exploded view illustrating the micro pump of the present disclosure and taken along rear viewpoint.
Figure 8:
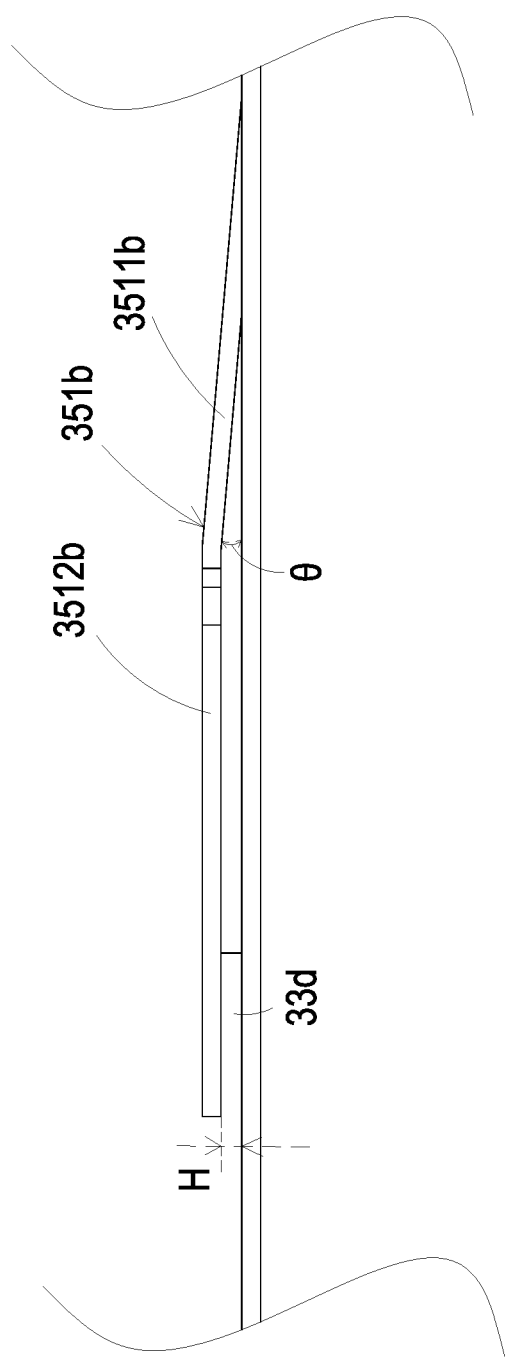
FIG. 8 is a partially enlarged view illustrating a conducting inside pin of the micro pump of the present disclosure.

Please refer to FIGS. 5 and 8. The insulation plate 34 and the conducting plate 35 are both thin frame-shaped plates, which are stacked sequentially on the piezoelectric actuator 33. In this embodiment, the insulation plate 34 is attached on the bottom surface 332b of the outer frame 33b of the piezoelectric actuator 33. The conducting plate 35 is stacked on the insulation plate 34, and the shape of the conducting plate 35 is corresponding to the shape of the outer frame 33b of the piezoelectric actuator 33. In an embodiment, the insulation plate 34 is formed by insulated material for insulation, for example but not limited to plastic. In an embodiment, the conducting plate 35 is formed by conductive material for electrical conduction, for example but not limited to metal. In an embodiment, a conducting pin 351a is disposed on the conducting plate 35 for electrical conduction. With regard to the two driving electrodes of the piezoelectric element 33d of the piezoelectric actuator 33, the conventional way is to fix a conducting wire on the piezoelectric element 33d by soldering, so as to extend out the electrode for electrical connection. However, it requires jigs to fix the conducting wire while extending out the electrode of the piezoelectric element 33d, and the fixed position of the conducting wire has to be varied according to different working procedures, which greatly increases the complicated level of assembling. In order to overcome the drawbacks caused by the conventional way of utilizing the conducting wire to extend out the electrode for electrical connection, the present disclosure utilizes the conducting plate 35 to provide a conducting inside pin 351b as one electrode of the two driving electrodes of the piezoelectric element 33d. The conducting inside pin 351b is formed from processing the conducting plate 35 by a stamping method. The conducting plate 35 may be a frame structure. The conducting inside pin 351b may be any shape extending inwardly from any side of the frame of the conducting plate 35, and the conducting inside pin 351b defines a conducting position configured to allow the external element to electrically connect the electrode. The conducting inside pin 351b is extended inwardly from any side of the frame of the conducting plate 35 to form an extension part 3511b with a bending angle θ and a bending height H, and the extension part 3511b has a bifurcation part 3512b. The bending height H is maintained between the bifurcation part 3512b and the frame of the conducting plate 35. The most appropriate height of the bending height H is equal to the thickness of the piezoelectric element 33d for allowing the bifurcation part 3512b to attach on the surface of the piezoelectric element 33d, which achieves the best effect of the contact between the bifurcation part 3512b and the piezoelectric element 33d. In this embodiment, there is an interval P in the middle of the bifurcation part 3512b, as shown in FIG. 5. The bifurcation part 3512b may be securely connected to the surface of the piezoelectric element 33d via the mediums applied to the interval P. These mediums may be, for example, melted alloy, conductive adhesive, conductive ink, conductive resin, or combinations thereof. With the fork-like design of the bifurcation part 3512b, better adhesion effect can be achieved when applied with the mediums as described above.

Figure 9A:
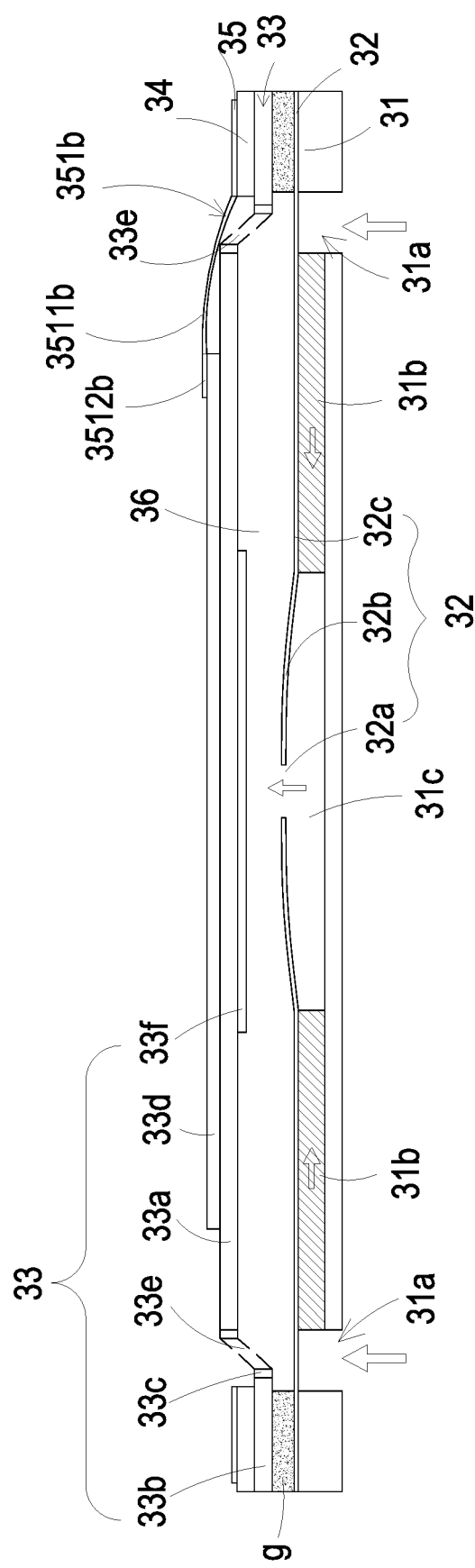
FIGS. 9A, 9B and 9C schematically illustrate the actions of the micro pump of FIG. 7A.
Figure 9B:
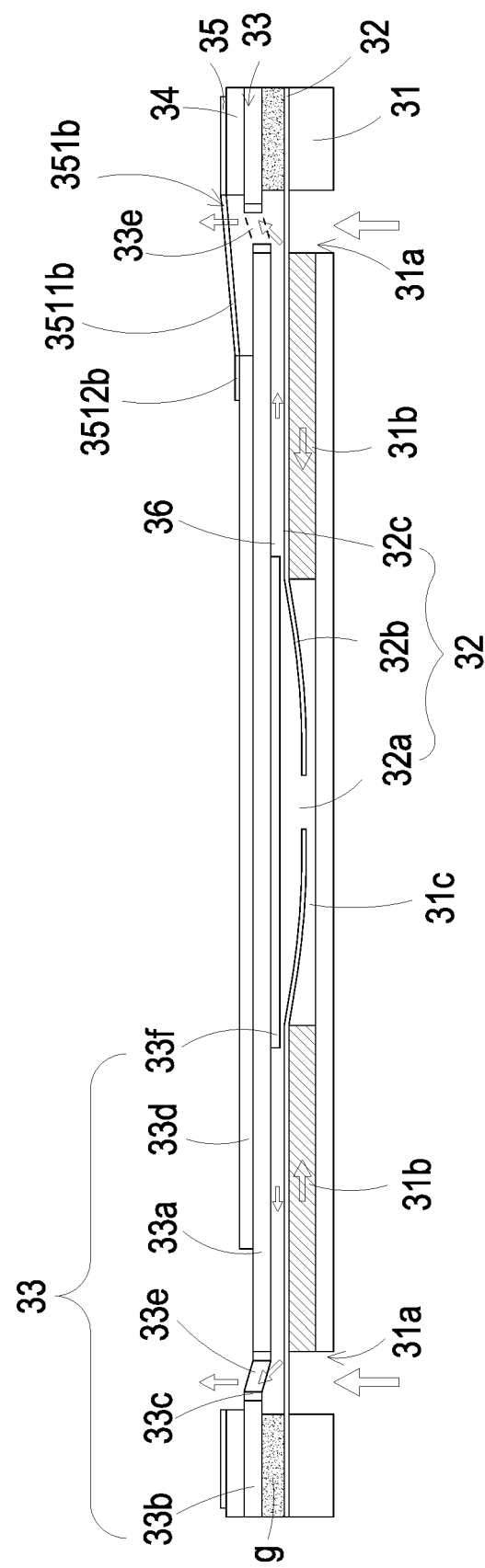
Figure 9C:
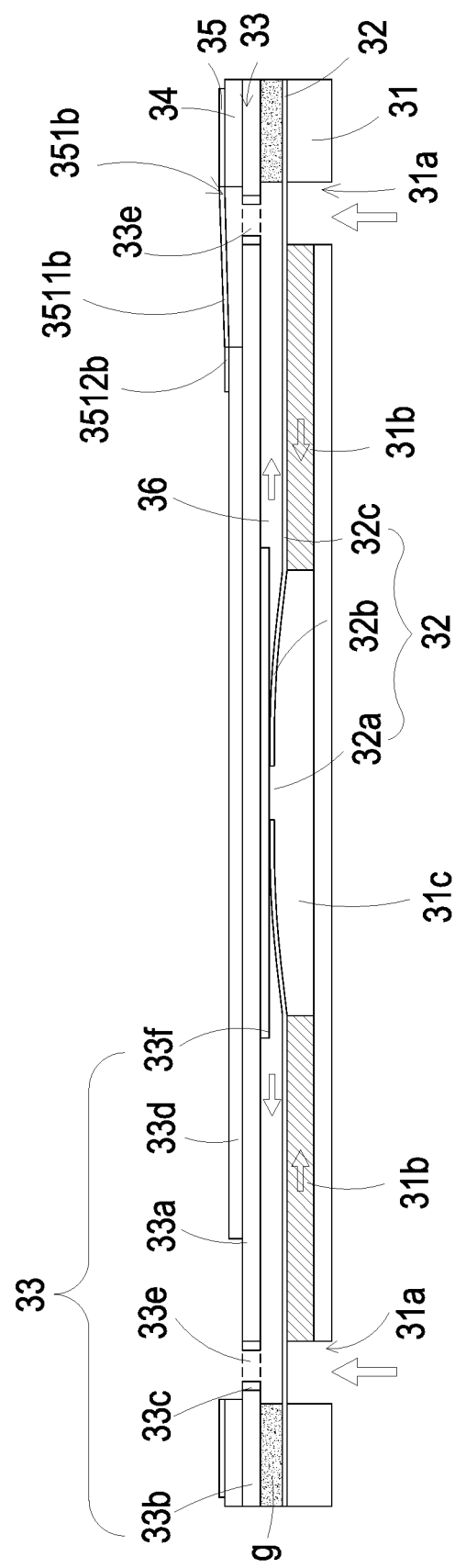

FIGS. 9A, 9B and 9C schematically illustrate the actions of the micro pump 3 of FIG. 7A. Please refer to FIG. 9A. When a driving voltage is applied to the piezoelectric element 33d of the piezoelectric actuator 33, the piezoelectric element 33d deforms to drive the suspension plate 33a to move in the direction away from the gas inlet plate 31. At the same time, the resonance plate 32 is in resonance with the piezoelectric actuator 33 to move in the direction away from the gas inlet plate 31. Accordingly, the volume of the chamber space 36 is increased, and a negative pressure is formed in the chamber space 36. The gas outside the micro pump 3 is inhaled through the inlet aperture 31a, then flows into the convergence chamber 31c through the convergence channel 31b, and finally flows into the chamber space 36 through the central aperture 32a. Please refer to FIG. 9B. The piezoelectric element 33d drives the suspension plate 33a to move toward the gas inlet plate 31, and the volume of the chamber space 36 is compressed, so that the gas in the chamber space 36 is forced to flow through the vacant space 33e in the direction away from the gas inlet plate 31. Thereby, the air transportation efficacy is achieved. Meanwhile, the resonance plate 32 is moved toward the gas inlet plate 31 in resonance with the suspension plate 33a, and the gas in the convergence chamber 31c is pushed to move toward the chamber space 36 synchronously. Moreover, the movable part 32b of the resonance plate 32 is moved toward the gas inlet plate 31, and the gas is stopped being inhaled through the inlet aperture 31a. Please refer to FIG. 9C. When the suspension plate 33a is driven to move in the direction away from the gas inlet plate 31 for returning to the horizontal position that the piezoelectric actuator 33 does not operate, the movable part 32b of the resonance plate 32 is moved in the direction away from the gas inlet plate 31 in resonance with the suspension plate 33a. Meanwhile, the gas in the chamber space 36 is compressed by the resonance plate 32 and is transferred toward the vacant space 33e. The volume of the convergence chamber 31c is expanded, and the air is allowed to flow through the inlet aperture 31a and the convergence channel 31b and converge in the convergence chamber 31c continuously. By repeating the above actions shown in FIGS. 9A to 9C, the air is continuously introduced through the inlet aperture 31a into the micro pump 3, and then the air is transferred through the vacant space 33e in the direction away from the gas inlet plate 31. Consequently, the gas is continuously inhaled into the micro pump 3, and the operation of transferring the gas in the micro pump 3 is realized.

As described above, the present disclosure provides a particle detecting device. The micro pump 3 is disposed in the accommodation frame slot 121 of the micro-pump accommodation region 12 of the base 1, and the inlet aperture 31a of the gas inlet plate 31 is sealed in the accommodation frame slot 121 and is in fluid communication with the inlet 122. When the micro pump 3, the particle sensor 22 and the laser transmitter 23 are enabled under the control of the microprocessor 21, the suction force is generated in the detecting channel 13 in fluid communication with the accommodation frame slot 121 by the operation of the micro pump 3. The suction force allows the gas outside the detecting channel 13 to be inhaled into the detecting channel 13. Since the detecting channel 13 is a straight gas-flowing path, the inhaled gas flows in the detecting channel 13 smooth and steady. Moreover, the gas in the detecting channel 13 passes through the orthogonal position where the detecting channel 13 intersects the beam channel 14. The passing gas is irradiated by the projecting light source L from the laser transmitter 23, which causes the projection light spots being projected on the particle sensor 22. Thereby, the particle sensor 22 can detect the size and concentration of the suspended particles contained in the gas. In addition, the projecting light source L along the beam channel 14 passes through the detecting channel 13 and is projected on the light trapping structure 151 of the light trapping region 15. Accordingly, a focus point is formed on the paraboloidal structure of the light trapping structure 151 so that the stray light is eliminated. Further, a light trapping distance W is maintained between the beam channel 14 and the position where the light trapping structure 151 receives the projecting light source L, and the light trapping distance W is greater than 3 mm. Therefore, the stray light being directly reflected back to the beam channel 14 is eliminated, the detection accuracy would not be distorted, and the results of particle detecting become more accurate. Moreover, the protective film 6 covers on and seals the outer inlet terminal of the detecting channel 13. Therefore, the detecting channel 13 is capable of introducing gas while being waterproof and dustproof, by which the larger particles contained in the outside air are filtered out. In this way, the protective film 6 may avoid introducing the larger particles into the detecting channel 13, and the detecting channel 13 is free of pollution. In other words, only the smaller suspended particles (e.g., PM2.5) are introduced into the detecting channel 13 for detection, and the detection accuracy and lifespan of the detecting channel 13 would not be affected. The particle detecting device provided in the present disclosure may be assembled to the portable electric device for forming a mobile particle detecting device. The portable electric device is for example but not limited to a mobile phone, a tablet computer, a wearable device or a notebook computer. Alternatively, the particle detecting device provided in the present disclosure may be assembled to the wearable accessory for forming a mobile particle detecting device. The wearable accessory is for example but not limited to a charm, a button, a glasses or a wrist watch.

From the above descriptions, the present disclosure provides a particle detecting device. A detecting channel and a beam channel are defined and partitioned in a slim base, and a laser transmitter and a particle sensor of the detecting element and the micro pump are positioned in the base. With the help of micro pump, the gas is transported along the detecting channel, which is a straight gas-flowing path. Thus, the introduced gas can pass through the orthogonal position where the detecting channel intersects the beam channel smoothly and steadily, and the size and concentration of the suspended particles contained in the gas can be detected. In addition, the light trapping structure of the light trapping region is a paraboloidal structure, and the light trapping distance between the beam channel and the position of the light trapping structure receiving the projecting light source from the light transmitter is maintained to be greater than 3 mm. Accordingly, the projecting light source from the light transmitter forms a focus point on the paraboloidal light trapping structure, and the stray light being directly reflected back to the beam channel is eliminated. Consequently, the results of particle detecting become more accurate. Moreover, there is a protective film, which covers on and seals the outer inlet terminal of the detecting channel. Consequently, the detecting channel is capable of introducing gas and being waterproof and dustproof at the same time, and the detection accuracy and lifespan of the detecting channel would not be affected. The particle detecting device of the present disclosure is really suitable to be assembled to the portable electric device and wearable accessory for forming a mobile particle detecting device allowing the user to monitor the concentration of surrounding suspended particles anytime and anywhere.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A particle detecting device, comprising:
   a base, wherein a detecting-element accommodation region, a micro-pump accommodation region, a detecting channel, a beam channel and a light trapping region are defined and partitioned inside the base, the detecting channel and the beam channel are perpendicular to each other, the beam channel perpendicularly passes through the detecting channel and is in fluid communication with the light trapping region, the detecting channel is a straight gas-flowing path, the micro-pump accommodation region is in fluid communication with the detecting channel;
   a detecting element comprising a microprocessor, a particle sensor and a laser transmitter, wherein the laser transmitter is positioned in the detecting-element accommodation region and is configured to transmit a projecting light source to the light trapping region through the beam channel, and the particle sensor is disposed at an orthogonal position where the detecting channel intersects the beam channel, thereby detecting a size and a concentration of suspended particles contained in a gas in the detecting channel;

a micro pump accommodated and positioned in the micro-pump accommodation region in fluid communication with the detecting channel, wherein the micro pump is configured to transport the gas in the detecting channel, wherein the micro pump comprises a gas inlet plate, a resonance plate, a piezoelectric actuator, an insulation plate and a conducting plate, and the gas inlet plate, the resonance plate, the piezoelectric actuator, the insulation plate and the conducting plate are stacked on each other sequentially, wherein the piezoelectric actuator comprises a piezoelectric element, and the conducting plate has a conducting inside pin formed by stamping, wherein the conducting inside pin is extended inwardly from one side of a frame of the conducting plate, and defines a conducting position configured to contact the piezoelectric element and for the purpose of positioning, wherein the conducting inside pin is extended inwardly from one side of the frame of the conducting plate to form an extension part with a bending angle and a bending height, the extension part has a bifurcation part, the bending height is maintained between the bifurcation part and the conducting plate, the bending height is equal to a thickness of the piezoelectric element for allowing the bifurcation part to attach on a surface of the piezoelectric element, and the bifurcation part is securely connected to the piezoelectric element via a medium; and a drive control board sealed and covered on a bottom of the base, wherein the microprocessor, the particle sensor and the laser transmitter are packaged and positioned on the drive control board and are electrically connected to the drive control board respectively, the particle sensor and the laser transmitter are driven and controlled by the microprocessor, and the micro pump is electrically connected to the drive control board for being driven and controlled by the microprocessor;

wherein when the micro pump, the particle sensor and the laser transmitter are enabled under the control of the microprocessor, a suction force is generated in the detecting channel and the gas outside the detecting channel is inhaled into the detecting channel, wherein when the gas in the detecting channel passes through the orthogonal position where the detecting channel intersects the beam channel, the gas passing therethrough is irradiated by the projecting light source from the laser transmitter, and projecting light spots generated are projected on the particle sensor for detecting the size and the concentration of suspended particles.

2. The particle detecting device according to claim 1, wherein the particle sensor is a PM2.5 sensor.

3. The particle detecting device according to claim 1, further comprising a protective film, wherein the protective film covers on and seals an outer inlet terminal of the detecting channel, wherein the protecting film is a film structure being waterproof and dustproof but allowing the gas to pass therethrough.

4. The particle detecting device according to claim 1, wherein the particle sensor detects the size and the concentration of the suspended particles contained in the gas and outputs a detection signal, the microprocessor receives and analyzes the detection signal outputted by the particle sensor, and the microprocessor outputs a detection data.

5. The particle detecting device according to claim 1, wherein an accommodation frame slot and an inlet are disposed at a bottom of the micro-pump accommodation region, an outlet in fluid communication with an outside space is disposed at a top of the micro-pump accommodation region, the inlet is in fluid communication between the detecting channel and the accommodation frame slot, the micro pump is accommodated and positioned on the accommodation frame slot, wherein when the micro pump is enabled, a suction force is generated in the detecting channel in fluid communication with the accommodation frame slot, the gas outside the detecting channel is inhaled into the detecting channel by the suction force, then the gas is introduced to a space above the accommodation frame slot by the transportation of the micro pump and is discharged from the outlet, and a gas transportation for gas detection is realized.

6. The particle detecting device according to claim 5, wherein the base has a first surface and a second surface, and the drive control board is sealed and covered on the second surface of the base.

7. The particle detecting device according to claim 6, further comprising an outer cover comprising a top cover and a bottom cover, wherein the top cover is covered on the first surface of the base and has an inlet hole and an outlet hole, the inlet hole is disposed corresponding in position to an outer inlet terminal of the detecting channel of the base, the outlet hole is disposed corresponding in position to the outlet of the micro-pump accommodation region, the bottom cover is covered on the second surface of the base and is engaged with the top cover for sealing the base, the bottom cover has an inlet opening and an outlet opening, the inlet opening is disposed corresponding in position to the inlet hole of the top cover, and the outlet opening is disposed corresponding in position to the outlet hole of the top cover, whereby the outside gas is introduced into the detecting channel of the base through the inlet opening and the inlet hole, and the gas in the detecting channel of the base is released from the outlet of the micro-pump accommodation region and is further discharged to the outside space through the outlet hole and the outlet opening.

8. The particle detecting device according to claim 1, wherein the light trapping region comprises a light trapping structure disposed therein and corresponding to the beam channel, so that the projecting light source from the light transmitter is received and the stray light being directly reflected back to the beam channel is eliminated.

9. The particle detecting device according to claim 8, wherein the light trapping structure is a paraboloidal structure.

10. The particle detecting device according to claim 8, wherein a light trapping distance is maintained between the beam channel and a position where the light trapping structure receives the projecting light source.

11. The particle detecting device according to claim 10, wherein the light trapping distance is greater than 3 mm.

12. The particle detecting device according to claim 1, wherein
the gas inlet plate has at least one inlet aperture, at least one convergence channel and a convergence chamber, wherein the at least one inlet aperture allows the gas to flow in, the at least one convergence channel is disposed corresponding to the at least one inlet aperture and is in fluid communication with the convergence chamber, and the at least one convergence channel guides the gas from the at least one inlet aperture toward the convergence chamber;

the resonance plate is assembled on the gas inlet plate by attaching and has a central aperture, a movable part and a fixed part, wherein the central aperture is located in a center of the resonance plate and is aligned with the convergence chamber of the gas inlet plate;

the piezoelectric actuator is assembled on the resonance plate via a filling material, wherein a chamber space is formed between the resonance plate and the piezoelectric actuator, the piezoelectric actuator further comprises a suspension plate, an outer frame, at least one connecting part and at least one vacant space, the at least one connecting part is connected between the suspension plate and the outer frame for elastically supporting the suspension plate, the at least one vacant space is formed between the suspension plate and the outer frame for allowing the gas to flow through, and the piezoelectric element is attached on the suspension plate;

the insulation plate is disposed on a side of the piezoelectric actuator; and the conducting plate is assembled with the insulation plate, wherein when the piezoelectric actuator is enabled, the gas from the at least one inlet aperture of the gas inlet plate is converged to the convergence chamber along the at least one convergence channel and flows through the central aperture of the resonance plate, whereby the air is further transferred through a resonance between the piezoelectric actuator and the movable part of the resonance plate.

13. The particle detecting device according to claim 12, wherein a region of the resonance plate around the central aperture and corresponding to the convergence chamber is the movable part.

14. The particle detecting device according to claim 12, wherein a region of a periphery of the resonance plate securely attached on the gas inlet plate is the fixed part.

15. The particle detecting device according to claim 12, wherein the filling material is a conductive adhesive.

16. The particle detecting device according to claim 12, wherein the outer frame has a first conducting pin and the conducting plate has a second conducting pin, configured for electrical conduction.

17. The particle detecting device according to claim 12, wherein the suspension plate has a first surface and a second surface opposite to the first surface, the piezoelectric element is attached on the second surface of the suspension plate, and the outer frame of the piezoelectric actuator has an assembling surface and a bottom surface.

18. The particle detecting device according to claim 17, wherein the first surface of the suspension plate is coplanar with the assembling surface of the outer frame.

19. The particle detecting device according to claim 17, wherein the at least one connecting part is formed between the suspension plate and the outer frame by stamping, the first surface of the suspension plate is not coplanar with the assembling surface of the outer frame, whereby a distance between the first surface of the suspension plate and the resonance plate is adjustable through the at least one connecting part by stamping.

\* \* \* \* \*